(12) United States Patent
Cabe et al.

(10) Patent No.: US 6,887,038 B2
(45) Date of Patent: May 3, 2005

(54) METHODS AND APPARATUS TO FACILITATE SEALING BETWEEN ROTATING TURBINE SHAFTS

(75) Inventors: Jerry Lynn Cabe, Cincinnati, OH (US); Osman Saim Dinc, Troy, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/653,336

(22) Filed: Sep. 2, 2003

(65) Prior Publication Data

US 2005/0047911 A1  Mar. 3, 2005

(51) Int. Cl.[7] .............................................. F01D 11/00
(52) U.S. Cl. .................... 415/174.2; 415/231
(58) Field of Search ................ 415/174.4, 174.5, 415/231, 173.3, 174.2; 277/355; 29/889.2

(56) References Cited

U.S. PATENT DOCUMENTS

| | | | |
|---|---|---|---|
| 4,426,087 A | | 1/1984 | Sargent et al. |
| 4,595,207 A | * | 6/1986 | Popp .......................... 277/303 |
| 4,995,620 A | * | 2/1991 | Zawaski et al. ............ 277/377 |
| 5,181,728 A | | 1/1993 | Stec |
| 6,196,790 B1 | | 3/2001 | Sheridan et al. |
| 6,244,599 B1 | * | 6/2001 | Braun et al. ................ 277/352 |

* cited by examiner

Primary Examiner—Ninh H. Nguyen
(74) Attorney, Agent, or Firm—William Scott Andes; Armstrong Teasdale LLP

(57) ABSTRACT

A method facilitates assembling a gas turbine engine. The method comprises coupling a seal assembly including a brush seal and a plurality of seal bristles to a first rotatable shaft, and positioning the seal assembly such that the seal bristles contact a second rotatable shaft to facilitate sealing between the first and second rotatable shafts during gas turbine engine operation.

20 Claims, 2 Drawing Sheets

METHODS AND APPARATUS TO FACILITATE SEALING BETWEEN ROTATING TURBINE SHAFTS

BACKGROUND OF THE INVENTION

This invention relates generally to gas turbine engines, and more specifically to seal assemblies used with gas turbine engine rotor assemblies.

At least some known gas turbine engines include a core engine having, in serial flow arrangement, a fan assembly and a high pressure compressor which compress airflow entering the engine, a combustor ignites a fuel-air mixture which is then channeled towards low and high pressure turbines which each include a plurality of rotor blades that extract rotational energy from airflow exiting the combustor. The high pressure compressor is coupled by a shaft to the high pressure turbine.

To facilitate sealing between rotor shafts, at least some known turbines include a plurality of seal assemblies to facilitate containing fluid within predetermined locations. For example, at least some known engines include a bearing compartment that is filled with an oil mist to provide lubrication to bearings that support an inner and outer rotor shaft. The inner and outer shafts are separated by a gap that may be filled with a working fluid used to cool the shafts. A seal assembly is used to prevent the oil mist from leaking into the gap defined between the shafts.

At least some known seal assemblies include a first portion that is coupled to the first rotor shaft and a second portion that is coupled to the second rotor shaft. However, because both seal assembly portions are rotating independently, such seal assemblies may be susceptible to leaking when thermal, mechanical, and centrifugal forces are induced to either or both rotor shafts. Other known seal assemblies include a first seal portion that is mounted to a stationary structure between the rotor shafts, such as an engine frame, and a second portion that is mounted to one of the rotor shafts. Because of the limited space between shafts, such seal assemblies are typically only used near an end of a shaft, and as such, may also be susceptible to deflections and/or rotor excursions cased by thermal, centrifugal, and/or gyroscopic forces induced to the rotor shaft.

BRIEF SUMMARY OF THE INVENTION

In one aspect, a method for assembling a gas turbine engine is provided. The method comprises coupling a seal assembly including a brush seal and a plurality of seal bristles to a first rotatable shaft, and positioning the seal assembly such that the seal bristles contact a second rotatable shaft to facilitate sealing between the first and second rotatable shafts during gas turbine engine operation.

In another aspect, a seal assembly for a gas turbine engine including a first rotatable shaft and a second rotatable shaft is provided. The seal assembly includes a brush seal and a plurality of seal projections extending outwardly from the brush seal. The brush seal is sealingly coupled to the first rotatable shaft such that the plurality of seal projections contact the second rotatable shaft to facilitate sealing between the first and second rotatable shafts.

In a further aspect, a gas turbine engine is provided. The engine includes a first rotatable shaft, a second rotatable shaft, and a seal assembly that extends between said first and second rotatable shafts to facilitate preventing leakage through a gap defined between the first and second rotatable shafts. The seal assembly includes a brush seal and a plurality of seal projections extending outwardly from the brush seal. The brush seal is sealingly coupled to the first rotatable shaft such that the plurality of seal projections contact the second rotatable shaft to facilitate sealing between the first and second rotatable shafts.

DETAILED DESCRIPTION OF THE INVENTION

Figure 1:
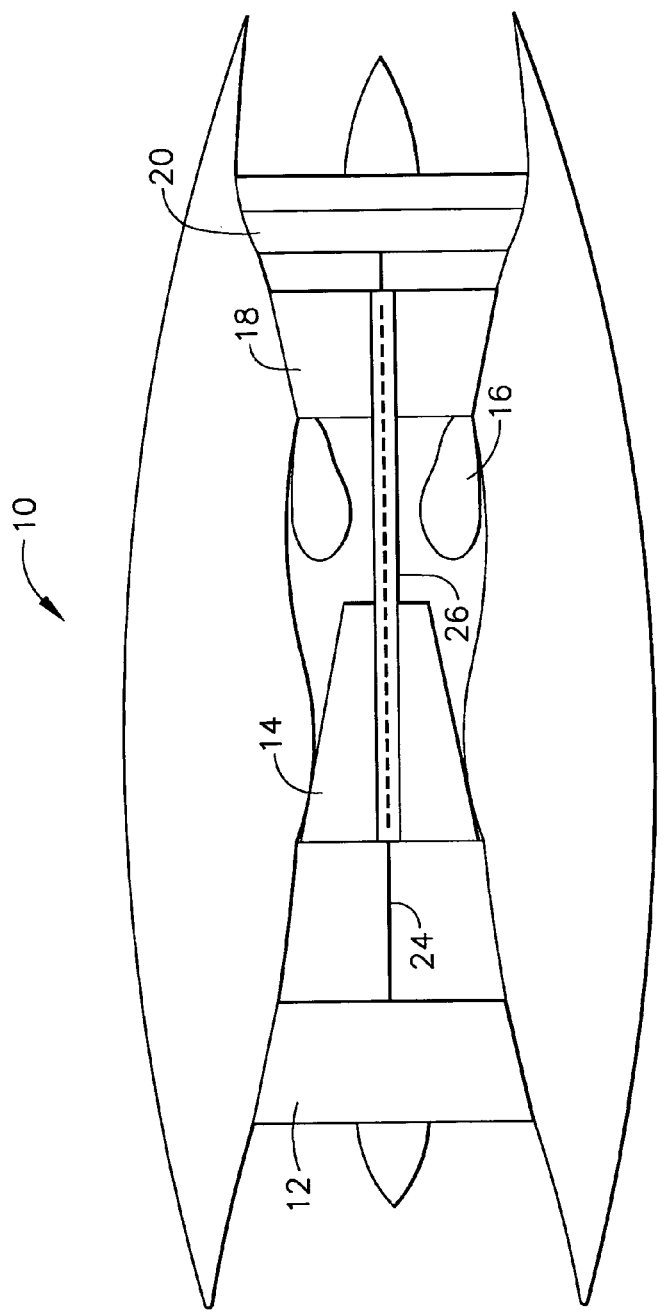
FIG. 1 is schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 24, and compressor 14 and turbine 18 are coupled by a second shaft 26. In one embodiment, the gas turbine engine is a GE90 available from General Electric Company, Cincinnati, Ohio.

In operation, air flows through low pressure compressor 12 and compressed air is supplied from low pressure compressor 12 to high pressure compressor 14. The highly compressed air is delivered to combustor 16. Airflow from combustor 16 drives turbines 18 and 20 before exiting gas turbine engine 10.

Figure 2:
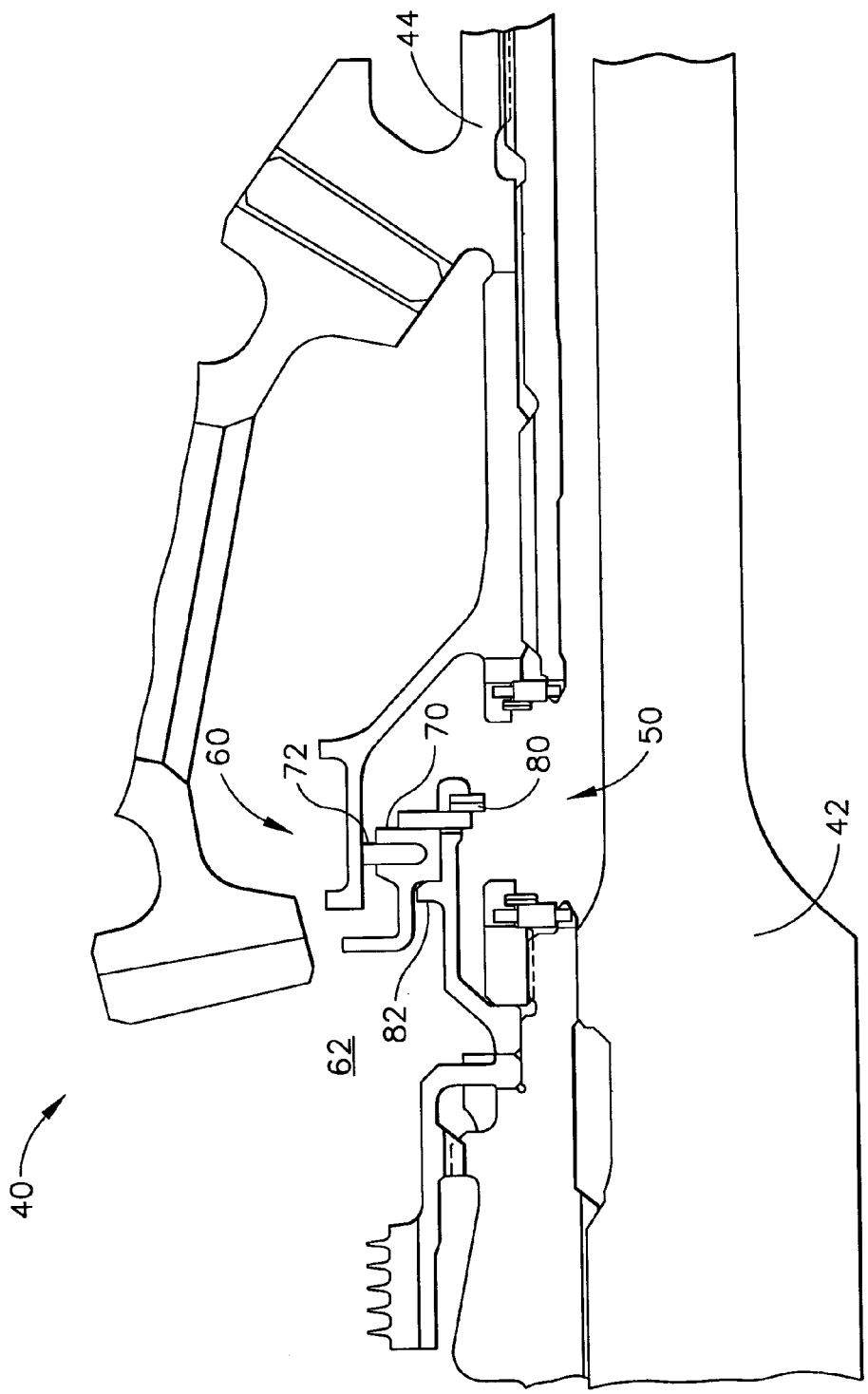
FIG. 2 is an enlarged partial cross-sectional view of a portion of rotor assembly that may be used with the gas turbine engine shown in FIG. 1.

FIG. 2 is an enlarged partial cross-sectional view of a portion of a rotor assembly 40 that may be used with gas turbine engine 10. As is known in the art, engine 10 also includes a stator assembly (not shown) that extends longitudinally through engine 10. Rotor assembly 40 cooperates with the stator assembly and includes a radially inner rotor shaft 42 and a radially outer rotor shaft 44. In the exemplary embodiment, rotor shafts 42 and 44 are co-axial and are counter-rotating such that first rotor shaft 42 rotates in a first direction that is opposite a second direction that second rotor shaft 44 rotates during engine operation. In an alternative embodiment, first rotor shaft 42 and second rotor shaft 44 are co-rotating and each shaft 42 and 44 rotates in the same direction.

Shafts 42 and 44 are spaced radially apart such that a gap 50 is defined therebetween. Gap 50 may be filled with a working medium gas supplied from a compressor, such as compressor 14, to facilitate cooling shafts 42 and 44. In the exemplary embodiment, gap 50 is filled with parasitic secondary air for use in cooling shafts 42 and 44.

An intershaft seal assembly 60 extends across gap 50 to facilitate preventing the working medium gas from leaking out of gap 50. In addition, seal 60 extends across gap 50 to facilitate preventing other fluids, such as oil mist, from being channeled downstream and into gap 50. For example, in the exemplary embodiment, a compartment 62 upstream from seal assembly 60 may be filled with oil mist to facilitate lubricating a component (not shown), such as a bearing, housed within compartment 62. Seal assembly 60 facilitates preventing the parasitic secondary air from leaking into compartment 62, and also prevents oil mist from leaking into gap 50.

Seal assembly 60 includes a brush seal 70 and a plurality of flexible seal members 72 that project radially outward from seal 70. In the exemplary embodiment, seal members 72 are a plurality of brush bristles which are formed integrally with brush seal 70 and extend substantially perpendicularly from brush seal 70.

Brush seal 70 is annular and extends in substantial sealing contact circumferentially around inner rotor shaft 42. In the exemplary embodiment, a fastener assembly 80 retains brush seal 70 against an abutment 82 extending outwardly from rotor shaft 42 such that seal 70 rotates concurrently with, and at the same rotational speed of, rotor shaft 42. In an alternative embodiment, brush seal 70 is coupled to shaft 44 rather than shaft 42. More specifically, when brush seal 70 is coupled in position relative to radially inner shaft 42, seal members 72 extend substantially radially outward towards outer shaft 44. In the exemplary embodiment, when seal assembly 60 is coupled in position relative to shafts 42 and 44, brush seal 70 circumscribes shaft 42 intermediate upstream and downstream ends (not shown) of inner shaft 42, and seal members 72 contact shaft 44 in substantial sealing contact intermediate upstream and downstream ends (not shown) of outer shaft 44. Accordingly, seal assembly 60 is known as an intershaft seal assembly.

During operation, brush seal 70 rotates simultaneously with, and at the same rotational speed as, inner shaft 42. Moreover, as brush seal 70 is rotated, because seal members 72 extend radially outward from brush seal 70, during rotation of shaft 42, seal members 72 are maintained in close proximity to outer shaft 44, regardless of a direction of rotation of outer shaft 44 with respect to inner shaft 42. Moreover, seal members 72 remain in close proximity to outer shaft 44 during engine operation, regardless of forces induced to seal assembly 60 or to shafts 42 and/or 44. Accordingly, seal assembly 60 is facilitated to be compliant to deflections and rotor excursions due to thermal, centrifugal, and/or gyroscopic forces. Furthermore, because brush seal 70 is coupled to rotor shaft 42, brush seal 70 and seal members 72 are substantially insensitive to rotor speed and centrifugal forces induced to seal assembly 60 during rotor operation. Accordingly, sealing contact is facilitated to be maintained between seal members 72 and shaft 44, such that leakage past seal assembly 60 is facilitated to be reduced in comparison to other known intershaft seal assemblies. Furthermore, because seal assembly 60 is not coupled to a stationary support structure, the mounting locations for seal assembly 60 are not as limited as compared to other known intershaft seal assemblies. Accordingly, seal assembly 60 facilitates extending a useful life of rotor assembly 40.

The above-described interstaft seal assemblies are cost-effective and highly reliable. The interstaft seal assembly includes a brush seal and a plurality of seal members that extend outwardly from the brush seal. The brush seal is coupled in sealing contact to a first rotor shaft such that the seal members extend towards the second shaft. Because the seal assembly is rotated concurrently with the first shaft, the seal members are maintained in close proximity to the second shaft regardless of the rotational speed or rotational direction of either of the shafts. Accordingly, the seal assembly is insensitive to rotor speed and centrifugal forces. Moreover, the seal configuration facilitates reducing leakage into and from the gap defined between the shafts at an intershaft location, without the requirement for a stationary support structure. As a result, the interstaft seal assembly facilitates extending a useful life of the turbine rotor assembly in a cost-effective and reliable manner.

Exemplary embodiments of rotor assemblies are described above in detail. The rotor assemblies are not limited to the specific embodiments described herein, but rather, components of each assembly may be utilized independently and separately from other components described herein. For example, each interstaft seal assembly component can also be used in combination with other interstaft seal assembly components and with other rotor assemblies.

While the invention has been described in terms of various specific embodiments, those skilled in the art will recognize that the invention can be practiced with modification within the spirit and scope of the claims.

What is claimed is:

1. A method for assembling a gas turbine engine, said method comprises:
    positioning a seal assembly including a brush seal and a plurality of seal bristles along a first rotatable shaft;
    positioning the seal assembly such that the seal bristles contact a second rotatable shaft to facilitate sealing between the first and second rotatable shafts during gas turbine engine operation; and
    coupling the brush seal to the first rotatable shaft such that the brush seal is retained between an abutment extending from the first rotatable shaft and a fastener assembly.

2. A method in accordance with claim 1 wherein coupling a seal assembly including a brush seal and a plurality of seal bristles to a first rotatable shaft further comprises coupling the seal assembly to the shaft such that the brush seal sealing contacts the first rotatable shaft and such that the plurality of brush bristles extend substantially radially outward from the brush seal.

3. A method in accordance with claim 1 wherein coupling a seal assembly including a brush seal and a plurality of seal bristles to a first rotatable shaft further comprises coupling the seal assembly to the shaft such that seal assembly rotates concurrently with the first rotatable shaft in a first direction, and such that the plurality of brush bristles contact a second rotatable shaft rotating in an opposite second direction.

4. A method in accordance with claim 1 wherein coupling a seal assembly including a brush seal and a plurality of seal bristles to a first rotatable shaft further comprises coupling the seal assembly to the shaft such that seal assembly rotates concurrently with the first rotatable shaft in a first direction, and such that the plurality of brush bristles contact a second rotatable shaft rotating in the same direction.

5. A method in accordance with claim 1 wherein coupling a seal assembly including a brush seal and a plurality of seal bristles to a first rotatable shaft further comprises coupling the seal assembly to the first rotatable shaft such that the seal assembly is intermediate a pair of opposite ends of the first rotatable shaft, and such that the plurality of brush bristles contact the second rotatable shaft intermediate a pair of opposite ends of the second rotatable shaft.

6. A seal assembly for a gas turbine engine including a first rotatable shaft and a second rotatable shaft, said seal assembly comprising a brush seal and a plurality of seal projections extending outwardly from said brush seal, said brush seal removably coupled to the first rotatable shaft by a fastener assembly such that said plurality of seal projections contact the second rotatable shaft to facilitate sealing between the first and second rotatable shafts.

7. A seal assembly in accordance with claim 6 wherein said brush seal rotates concurrently with the first rotatable shaft.

8. A seal assembly in accordance with claim 6 wherein the first rotatable shaft includes a pair of opposite ends, said brush seal is coupled to the first rotatable shaft intermediate the first shaft ends.

9. A seal assembly in accordance with claim 6 wherein the second rotatable shaft includes a pair of opposite ends, said plurality of seal projections contact the second shaft intermediate the second shaft ends.

10. A seal assembly in accordance with claim 6 wherein said plurality of projections comprise a plurality of bristles formed integrally with said brush seal.

11. A seal assembly in accordance with claim 6 wherein said plurality of seal projections facilitate reducing leakage through said seal assembly due to thermal, centrifugal, and gyroscopic forces.

12. A gas turbine engine comprising:
   a first rotatable shaft comprising an abutment;
   a second rotatable shaft; and
   a seal assembly extending between said first and second rotatable shafts to facilitate preventing leakage through a gap defined between said first and second rotatable shafts, said seal assembly comprising a brush seal and a plurality of seal projections extending outwardly from said brush seal, said brush seal removably coupled to the first rotatable shaft such that said brush seal is retained between an abutment extending from the first rotatable shaft and a fastener assembly, and such that said plurality of seal projections contact the second rotatable shaft to facilitate sealing between the first and second rotatable shafts.

13. A gas turbine engine in accordance with claim 12 wherein said seal assembly brush seal rotates concurrently with the first rotatable shaft.

14. A gas turbine engine in accordance with claim 13 wherein said first rotatable shaft comprises a pair of opposite ends, said second rotatable shaft comprises a pair of opposite ends, said brush seal is coupled to said first rotatable shaft intermediate said first rotatable shaft ends.

15. A gas turbine engine in accordance with claim 13 wherein said first rotatable shaft comprises a pair of opposite ends, said second rotatable shaft comprises a pair of opposite ends, said plurality of seal projections contact said second rotatable shaft intermediate said second rotatable shaft ends.

16. A gas turbine engine in accordance with claim 13 wherein said seal assembly plurality of projections comprise a plurality of bristles formed integrally with said brush seal.

17. A gas turbine engine in accordance with claim 13 wherein said seal assembly plurality of seal projections facilitate reducing leakage through said seal assembly due to thermal, centrifugal, and gyroscopic forces.

18. A gas turbine engine in accordance with claim 13 wherein said rotatable first shaft rotates in a first direction, said second rotatable shaft rotates in a second direction that is opposite said first direction of rotation.

19. A gas turbine engine in accordance with claim 13 wherein said first and second rotatable shafts rotate in the same rotational direction.

20. A gas turbine engine in accordance with claim 13 wherein said seal assembly facilitates extending a useful life of said gas turbine engine.

* * * * *